(12) United States Patent
Chen et al.

(10) Patent No.: US 9,757,850 B2
(45) Date of Patent: Sep. 12, 2017

(54) MULTI-FUNCTION CAR CHARGER

(71) Applicants: Wen Chen, Guangzhou (CN); Feng Yu, Guangzhou (CN)

(72) Inventors: Wen Chen, Guangzhou (CN); Feng Yu, Guangzhou (CN)

(*) Notice: Subject to any disclaimer, the term of this patent is extended or adjusted under 35 U.S.C. 154(b) by 166 days.

(21) Appl. No.: 14/794,829

(22) Filed: Jul. 9, 2015

(65) Prior Publication Data

US 2016/0105046 A1  Apr. 14, 2016

(30) Foreign Application Priority Data

Oct. 14, 2014 (CN) .......................... 2014 1 0542044

(51) Int. Cl.
*H02J 7/00* (2006.01)
*B25D 1/00* (2006.01)
*A62B 3/00* (2006.01)

(52) U.S. Cl.
CPC ............... *B25D 1/00* (2013.01); *A62B 3/00* (2013.01); *B25D 2250/271* (2013.01); *B25D 2250/295* (2013.01); *H02J 7/0042* (2013.01)

(58) Field of Classification Search
CPC ............. B25D 1/00; H02J 7/0042; A62B 3/00
USPC ........................................................ 320/107
See application file for complete search history.

(56) References Cited

U.S. PATENT DOCUMENTS

| | | | |
|---|---|---|---|
| 7,073,923 B2 * | 7/2006 | Cope .................... | H02J 7/0042 320/114 |
| 8,148,940 B2 * | 4/2012 | Liu ....................... | H02J 7/0054 307/151 |
| 2002/0030467 A1 * | 3/2002 | Small ................... | H01M 2/1055 320/107 |
| 2013/0106352 A1 * | 5/2013 | Nagamine ............ | H02J 7/0042 320/113 |

* cited by examiner

*Primary Examiner* — M'Baye Diao
(74) *Attorney, Agent, or Firm* — Leong C. Lei

(57) ABSTRACT

A multi-function car charger comprises a housing, a first electrode, a PCB board, a second electrode and a power output port. The car charger further includes a safety hammer, a rear end of safety hammer which is fixed in the housing. The car charger, the safety hammer and other accessories are integrated as a whole to reduce the quantity of car accessories and reduce the occupied space of the car accessories. The safety hammers is placed at a car charger socket where a cigarette lighter is easy to take, thereby attaining the convenience of use.

10 Claims, 3 Drawing Sheets

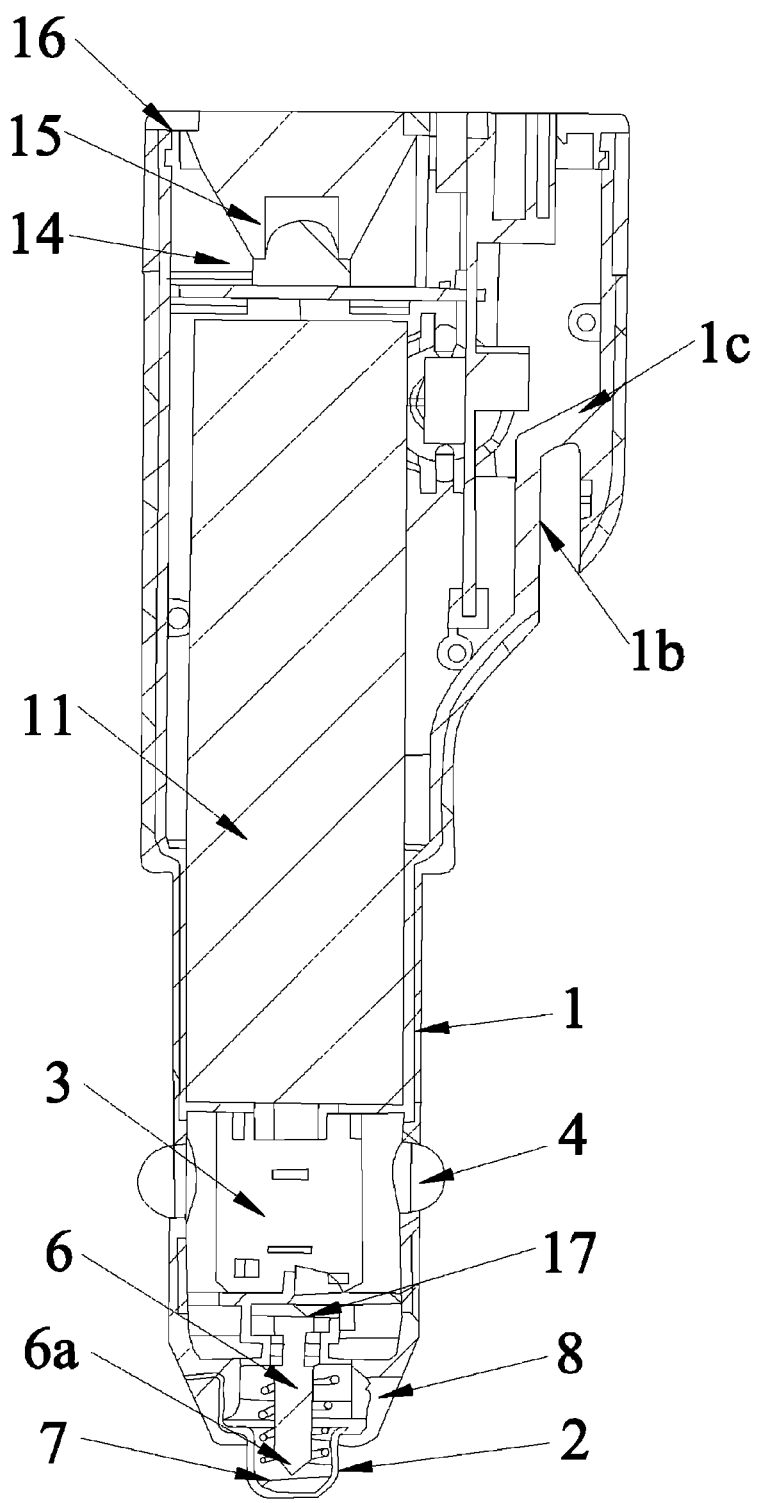
F I G. 2

MULTI-FUNCTION CAR CHARGER

BACKGROUND OF THE INVENTION

1. Field of the Invention

This invention relates to a car charger and relates particularly to a multi-function car charger.

2. Description of the Related Art

For convenience of people charging electricity for electronic apparatus when riding in a car, a car charger has already been used in car field extensively. The car charger obtained electricity from an interface of a car cigarette lighter, and recharge electricity for smart phone and terminal electronic apparatus through the interface of an electric conductivity. At same time, people has raised safety awareness when riding in a car, now, cars all composed safety hammers for emergency condition usage to make sure the safety of people and property. A traditional car charger can only fulfill the function of electricity recharge, the safety hammer can only fulfill the function of seek to survive for safety under an emergency condition, both of the two instruments only provide with a single function. A car need to equip a car charger and a safety hammer, the situation on one hand is more spaces being taken of the car, on the other hand the safety hammer do not be used at ordinary. The safety hammer always put at a tool box which is not easy to get therefore, such condition caused inconvenient use. Once sudden incidents such as puddle of rain water or spontaneous combustion of a car, the safety hammer can be found hardly in a hurry, people can not break a window and escape from a car timely. Safety of people and property in the car thereof are damaged.

SUMMARY OF THE INVENTION

The object of this invention is to provide a multi function car charger to decrease occupied space of car accessories. For fulfilling the purpose as above mentioned, the multi function car charger in accordance with this invention comprises a housing, a first electrode set at a front end of the housing, a PCB board set at inside of the housing, a second electrode set on a peripheral wall of the housing and a power output port set at a rear end of the housing. The car charger further included a safety hammer set inside of the first electrode, the first electrode being retractably inserted into the front end of the housing, a spring is wound round an exterior of the safety hammer. One end of the spring is fixed in interior of the housing, another end against interior of the first electrode. A rear end of the safety hammer is fixed inside of the housing, a front end of the hammer head thereof which stretches out of the hammer head to the front end of the housing. The hammer head of the safety hammer is exposed to an exterior of the housing when the first electrode retracts. Preferably, an indentation is formed on a housing, a blade is set in the indentation.

Preferably, a place where the indentation of the housing is formed a protrusion part, the indentation is defined in the protrusion part and having an opening which is directed toward the first electrode.

Preferably, a functional board is disposed at a rear end of a housing, the power output port is disposed on the functional board.

Preferably, a lighting device is disposed on the functional board, the lighting device is electrically connected to the PCB board, a switch is disposed on the housing, the switch is electrically connected to the lighting device.

Preferably, a charging battery is disposed in inside of the housing, the charging battery is disposed between the PCB board and the functional board, the charging battery is electrically connected to the PCB board.

Preferably, the charging battery further included a front cover, the front cover is threadedly connected to a front end of the housing. A through hole is defined on a front end of the front cover, the first electrode passing through the through hole of the front cover, and a limiting step disposed at a rear end of the first electrode. A diameter of the limiting step is larger than a bore diameter of the through hole of the front cover.

Preferably, an annular locking slot is formed on a circumference of the safety hammer, an annular ring is disposed on an interior of the housing for fitting the annular locking slot. The annular locking slot of the safety hammer is locked with the annular ring of the housing.

Preferably, the safety hammer has a tapering hammer head.

Preferably, the housing includes a left half housing and a right half housing.

The technical program of the multi-function car charger as above-mentioned thereof has beneficial effects as follows: The safety hammer integrated into the charger fulfilled multiple functionalization of the car charger. The car charger reduce the quantity of the car accessories, and further reduce occupied space of the car accessories. When the car charger inserting into a car charger socket of a car, an electrode cap bounce back by affecting of the spring. Thereby it can prevents the car charger from separating the car charger socket when the car in a jolt. In the meanwhile, the safety hammer disposed in the interior of the electrode cap which can be used under emergency condition. Once a user needs to use a safety hammer, the user only needs to poke out the car charger from the car charger socket, and the user's hands hold a rear end of the housing and struck car window glass or another position hardly by the first electrode. The first electrode retracts when striking and exposing hammer head of the safety hammer. Therefore the car window glass can be broken. Owing to the safety hammer is placed at a position easy to take, once an emergency accident occurred, the safety hammer is conveniently to take out. The facilitation of use is raised for a driver or a passenger. A car window glass can be broken timely when an emergency accident happened, people in the car can escape from danger smoothly, the safety of riding a car is raised. Moreover, the charger further integrated a cutting blade tool, a removable power, an electric torch as a whole and some accessories are reduced. The performance of safety protection exceedingly raising up.

The advantages of this invention over the known prior arts will become more apparent upon reading the following descriptions in junction with the accompanying drawings.

BRIEF DESCRIPTION OF THE DRAWINGS

FIG. 2 is a cross-sectional view showing a first preferred embodiment of this invention of A-A of FIG. 1.

DETAILED DESCRIPTION OF THE PREFERRED EMBODIMENTS

The advantages of this invention will become more apparent upon reading the following descriptions in junction with the accompanying drawings. The following embodiments are described to show this invention but not made to restrict the scope of this invention.

Figure 1:
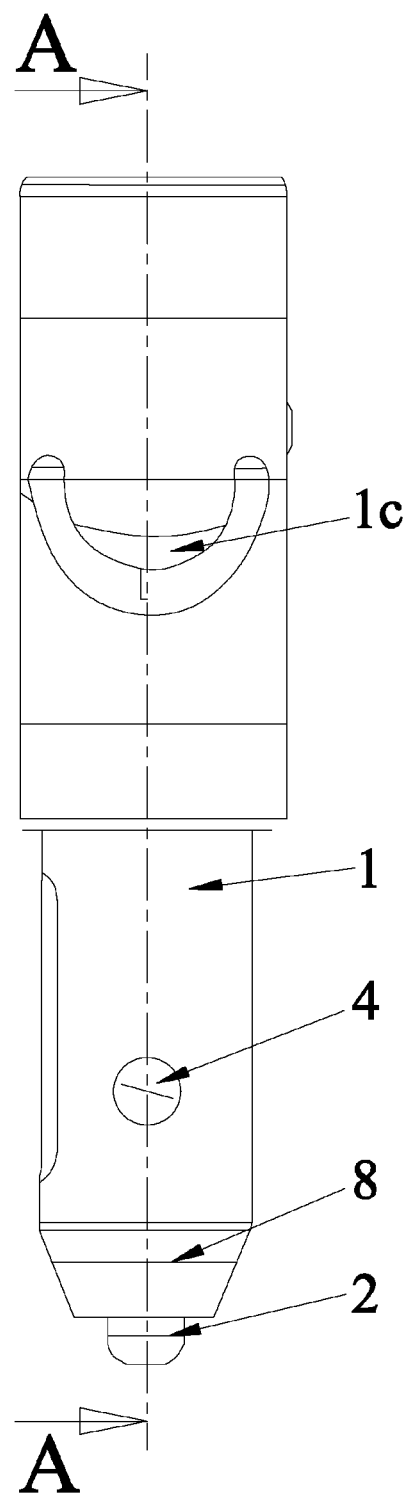
FIG. 1 is a perspective view showing a first preferred embodiment of this invention.
Figure 3:
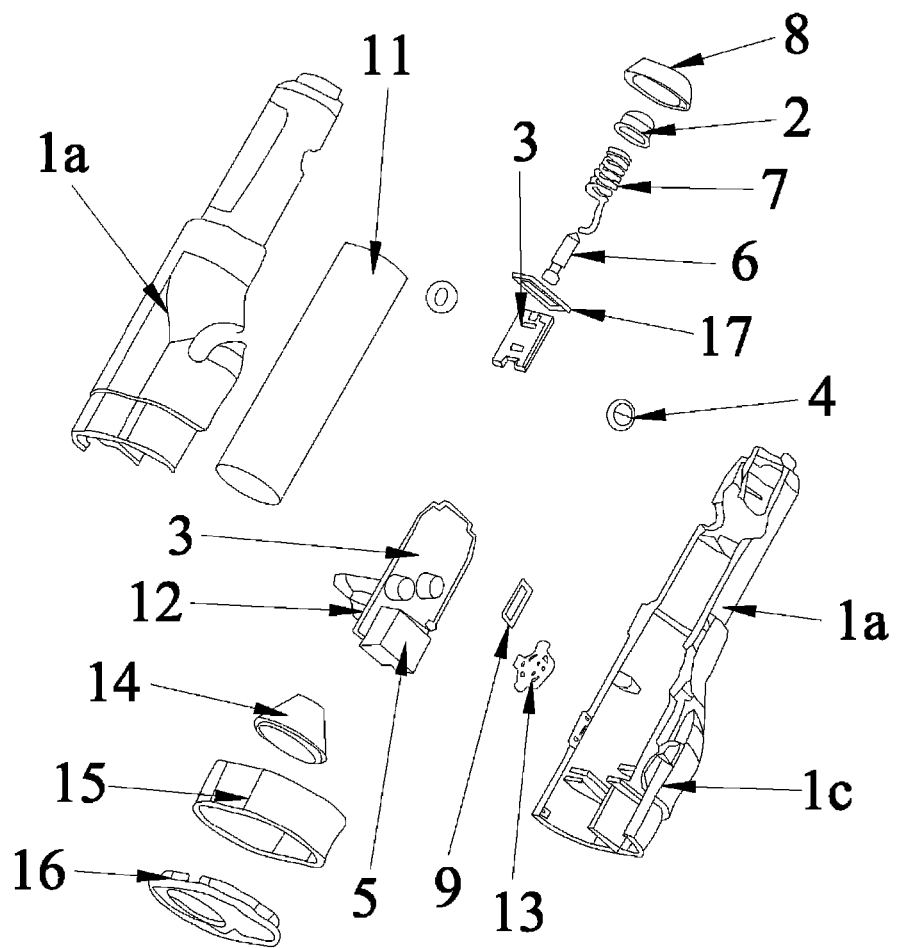
FIG. 3 is a exploded view showing a first preferred embodiment of this invention.

FIGS. 1 and 3 show a first preferred embodiment of a multi-function car charger 1 of this invention. The multi-function car charger 1 comprises a housing, a first electrode 2 disposed at a front end of the housing 1, a PCB board disposed in the interior of housing 1 (Printed circuit board) 3. A second electrode 4 disposed on a peripheral wall of the housing 1 and disposed at a rear end of a power output port 5, the power output port can served as an USB interface or a power connectors. The first electrode 2 and the second electrode 4 are separately represented a positive pole and a negative pole. Preferably, the first electrode 2 is a positive pole, the second electrode 4 is a negative pole. Wherein, the embodiment of this invention also included an safety hammer 6, the first electrode 2 retractably insert in a front end of the housing, a spring 7 is wound round an exterior of the safety hammer 6, one end of the spring 7 is fixed in the housing 1, another end of the spring is set against an inner side of the first electrode 2; a rear end of the safety hammer 6 is fixed inside of the housing 1, a front end of the hammer head 6a stretches to the front end of the housing 1, as FIG. 2, a hammer head of the safety hammer 6 is exposed to an exterior of the housing 1 when the first electrode 2 retracts. The hardness preferably of the hammer head 6a of the safety hammer 6 of this embodiment is HRC58-62, so that a user can break a car window glass, and make sure the hammer head of the safety hammer is not easy to be broken by a firm substance. For upraising the strike performance of the safety hammer, the stress can be concentrated on top, it is convenient to shatter and break a glass if needed. Moreover, a harden metallic lump 17 disposed at a rear end of the safety hammer 6. The housing 1 is composed by two half housings 1a includes a left housing and a right housing, as FIG. 3, a user can conveniently process and take apart thereof. The charger comprising the first electrode 2 and the second electrode 4 are preferably of adopting structure of an electrode cap for installing convenience. The second electrode 4 are symmetrical fittings of two, the position is button left and right of two half housings.

This invention integrated the safety hammer into the car charger, car accessories are decreased, further reduce occupied space of the car accessories. When the car charger inserting into a car charger socket of a car cigarette lighter, an electrode cap bounce back by affecting of the spring. Thereby it can prevents the car charger separating from the car charger socket when the car in a jolt. In the meanwhile, the safety hammer disposed in the interior of the electrode cap which can be used under emergency condition. Once a user needs to use a safety hammer, the user only need to poke out the car charger from the car charger socket, and the user's hands hold a rear end of the housing and struck car window glass or another position hardly by the first electrode. The first electrode retracts when striking and exposing hammer head of the safety hammer. Therefore the car window glass can be broken. Owing to the safety hammer is placed at a position easy to take, once an emergency accident occurred, the safety hammer is conveniently to take out. The facilitation of use is raised for a driver or a passenger. A user only need to pull out the car charger from the car charger socket and strike hardly to break car window and get away from the car window, people in the car can escape from danger smoothly, thus the safety performance when riding a car is raising up.

For the convenience of taking apart of the car charger, the car charger of this embodiment also included a front cover 8, the front cover 8 threadly connected to a front end of the housing 1, a through hole set at front end of the front cover 8, the first electrode 2 pass through the through hole of the front cover 8 connected to a front end of the housing 1 retractably. And a rear end of the first electrode 2 installed a limiting step, a diameter of the limiting step is larger than a bore diameter of the through hole of the front cover 8. The first electrode 2 matched up with the through hole of the front cover to form an anti-falling structure, the structure can prevent the first electrode 2 from departing the front cover.

The safety hammer 6 of this embodiment is fitting with inside of the housing 1, concretely, an annular locking slot is formed on a rear end of circumference of the safety hammer 6. An annular ring is disposed on an interior of the housing 1 for fitting the annular locking slot, the annular locking slot of the safety hammer is locked within the annular ring of the housing. The safety hammer can be stably fixed in the housing therefore.

Referring to FIGS. 2 and 3, a housing 1 of the first preferred embodiment of this invention comprises an indentation 1b, especially installing a U shape indentation. The interior of the indentation 1b install a blade 9, the blade 9 lodge in inside of the indentation 1b, the usage of this installment is for cutting off a rope object of safety belt under an emergency condition. The installment is for the convenience of escaping for survive. Optimization of the installment, the housing 1 defined an indentation 1b is a protrusion part 1c, the indentation 1b defined at the interior of the protrusion part 1c and the opening is directed toward the first electrode 2. Therefore, an edge of the blade 9 is directed toward car body when the blade 9 is not in use, and because the indentation is not exposed at portion of handhold of the housing 1, so the foregoing can prevent the blade from hurting other people or articles.

Rear end of the housing of the first preferred embodiment of this invention comprises a functional board 10, a power output port 5 dispose on the functional board 10. Besides, a lighting device 12 set on the functional board 10, the lighting device 12 is electrically connected with a PCB board 3. The housing 1 at the same time set a switch 13, the switch 13 is electrically connected with the lighting device 12, the switch 13 is preferably of a push-button switch, the switch 13 can control start and shut down of the lighting device 12. The interior of the switch 13 installed two control circuits, there are first control circuit and second control circuit. The first control circuit control the lighting device emitting white light, the second control circuit control the lighting device emitting a caution light. When a user long-press the switch, the user can detonate the first control circuit, then the lighting device emit white light, the lighting device can be used as an electric torch. When a user short-press the switch, the user can detonate the second control circuit, then the lighting device twinkling the caution light, the car charger at the same time can put on top of the car or other positions when parking to warm other cars in process, this action can avoid collision happened. The lighting device 12 of the first preferred embodiment of this invention can adopt a straw hat typed of lamps. And the lighting device 12 can adopt a patch typed LED lamps, the preferably is the patch typed of LED lamps, the brightness is better, electricity saving more, and can save resources. The rear end of the housing of the first preferred embodiment of this invention installed a transparent back cover 16. Lens 14 and an aluminum circle 15 installed in order between the lighting device 12 and the transparent back cover 16.

The first preferred embodiment of this invention also provided the function of a removable power, a charging battery 11 further installed in the housing. The charging battery set up between a PCB board and a functional board, and electricity connected with PCB board. When the car charger inserting into the car charger socket, the removable power can recharge the electricity to the charging battery, the charging battery can be use for recharging the electronic apparatus and the lighting devices even it is not insert in the car charger socket, therefore the removable charger can provide a usage under a sudden and an emergency condition.

The car charger of the first preferred embodiment of this invention combined functions with a rechargeable instrument, a safety hammer, a cutting tool, a removable power, an electric torch, which are integrated multi-function as a whole and provided a convenient usage. Once an accident occurred, a driver or a passenger can use it conveniently, the performance of safety protection is raised and the quantity of the accessories is reduced, the occupied space of car's accessories further to reduce.

While the embodiments of this invention are shown and described, it is understood that further variations and modifications may be made without departing from the scope of this invention.

We claim:

1. A multi-function car charger comprising a housing, a first electrode disposed at a front end of said housing, a PCB board disposed inside said housing, a second electrode disposed on a peripheral wall of said housing and a power output port disposed at a rear end of said housing; wherein said car charger further includes a safety hammer disposed in said first electrode, said first electrode being retractably inserted into said front end of said housing, a spring being wound round an exterior of said safety hammer, one end of said spring being fixed in said housing, another end of said spring being set against an inner side of said first electrode, a rear end of said safety hammer being fixed inside said housing and providing a hammer head at a front end thereof which stretches out of said front end of said housing, said hammer head of said safety hammer being exposed to an exterior of said housing when said first electrode retracts.

2. The multi-function car charger as claimed in claim 1, wherein an indentation is formed on said housing, a blade being disposed in said indentation.

3. The multi-function car charger as claimed in claim 2, wherein a place where said indentation of said housing is formed a protrusion part, said indentation being defined in said protrusion part and having an opening which is directed toward said first electrode.

4. The multi-function car charger as claimed in claim 1, wherein a functional board is disposed at a rear end of said housing, said power output port being disposed on said functional board.

5. The multi-function car charger as claimed in claim 4, wherein a lighting device is disposed on said functional board, said lighting device being electrically connected to said PCB board, a switch being disposed on said housing, said switch being electrically connected to said lighting device.

6. The multi-function car charger as claimed in claim 4, wherein a charging battery is disposed on said housing, said charging battery being disposed between said PCB board and said functional board, said charging battery being electrically connected to said PCB board.

7. The multi-function car charger as claimed in claim 1 further comprising a front cover, said front cover being threadedly connected to said front end of said housing, a through hole being defined on a front end of said front cover, said first electrode passing through said through hole of said front cover, a limiting step being formed in a rear of said first electrode, a diameter of said limiting step being larger than a bore diameter of said through hole of said front cover.

8. The multi-function car charger as claimed in claim 1, wherein an annular locking slot is formed on a circumference of said rear end of said safety hammer, an annular ring being disposed on an interior of said housing for fitting said annular locking slot, said annular locking slot of said safety hammer being locked with said annular ring of said housing.

9. The multi-function car charger as claimed in claim 1, wherein said safety hammer has a tapering hammer head.

10. The multi-function car charger as claimed in claim 1, wherein said housing includes a left half housing and a right half housing.

* * * * *